United States Patent
Oyman et al.

(10) Patent No.: US 8,462,695 B2
(45) Date of Patent: Jun. 11, 2013

(54) APPARATUS AND METHODS FOR MULTI-RADIO COORDINATION OF HETEROGENEOUS WIRELESS NETWORKS

(75) Inventors: Ozgur Oyman, Palo Alto, CA (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 12/454,505

(22) Filed: May 18, 2009

(65) Prior Publication Data

US 2010/0290352 A1 Nov. 18, 2010

(51) Int. Cl.
*H04W 4/00* (2009.01)
*H04L 12/28* (2006.01)
*H04L 12/413* (2006.01)
*H04J 3/16* (2006.01)
*H04J 3/22* (2006.01)
*H04B 17/00* (2006.01)

(52) U.S. Cl.
USPC ........... 370/328; 370/431; 370/445; 370/465; 455/266

(58) Field of Classification Search
USPC ... 370/328, 329, 431, 445, 465–469; 455/266
See application file for complete search history.

(56) References Cited

U.S. PATENT DOCUMENTS

| 7,092,731 | B2 * | 8/2006 | Gopalakrishnan et al. | ... 455/522 |
| 8,130,699 | B2 * | 3/2012 | Stanwood et al. | ............ 370/328 |
| 2003/0161268 | A1 | 8/2003 | Larsson et al. | |
| 2005/0003827 | A1 | 1/2005 | Whelan | |
| 2005/0122999 | A1 * | 6/2005 | Scherzer et al. | ............. 370/480 |
| 2006/0215686 | A1 | 9/2006 | Takeuchi | |
| 2007/0008923 | A1 * | 1/2007 | Tandon et al. | ................ 370/329 |
| 2007/0099567 | A1 | 5/2007 | Chen | |
| 2007/0111757 | A1 * | 5/2007 | Cao et al. | ...................... 455/561 |
| 2008/0075109 | A1 * | 3/2008 | Zangi | ............................ 370/458 |
| 2008/0080460 | A1 * | 4/2008 | Ramkumar et al. | ......... 370/342 |
| 2008/0227456 | A1 * | 9/2008 | Huang et al. | ................... 455/436 |
| 2008/0293423 | A1 * | 11/2008 | Park et al. | ..................... 455/450 |
| 2009/0040974 | A1 * | 2/2009 | Goldhamer | ................... 370/329 |
| 2009/0201862 | A1 * | 8/2009 | Okker et al. | .................. 370/329 |
| 2009/0225696 | A1 * | 9/2009 | Ramachandran et al. | .... 370/328 |
| 2010/0061326 | A1 * | 3/2010 | Lee et al. | ...................... 370/329 |
| 2010/0067506 | A1 * | 3/2010 | Denteneer et al. | ........... 370/338 |
| 2010/0074190 | A1 * | 3/2010 | Cordeiro et al. | .............. 370/329 |
| 2010/0265842 | A1 * | 10/2010 | Khandekar et al. | ........... 370/252 |

FOREIGN PATENT DOCUMENTS

WO    2010/135040 A2    11/2010

OTHER PUBLICATIONS

Arambepola, Bernard, et al., "Algorithm for Managing Data Loss in Software Demodulators", U.S. Appl. No. 12/316,876, filed Dec. 16, 2008.

International Search Report and Written Opinion received for PCT Patent Application No. PCT/US2010/030680, mailed on Nov. 26, 2010, 9 pages.

* cited by examiner

*Primary Examiner* — Xavier Szewai Wong
(74) *Attorney, Agent, or Firm* — Kacvinsky Daisak PLLC

(57) ABSTRACT

Embodiments of systems and methods for multi-radio coordination of heterogeneous wireless networks are generally described herein. Other embodiments may be described and claimed.

17 Claims, 5 Drawing Sheets

APPARATUS AND METHODS FOR MULTI-RADIO COORDINATION OF HETEROGENEOUS WIRELESS NETWORKS

TECHNICAL FIELD

The present disclosure relates generally to the field of wireless communications and more particularly to methods and related systems with coordinated multi-networking capabilities for multi-radio coordination in heterogeneous networks.

BACKGROUND

As wireless communication becomes more and more popular at offices, homes, and schools, different wireless technologies and applications may work in tandem to meet the demand for computing and communications at anytime and/or anywhere. For example, a variety of wireless communication networks may co-exist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide an even broader range as such networks are widely deployed in cellular infrastructure. Although each of the above-mentioned wireless communication networks may support different usages, co-existence among these networks may provide a more robust environment with anytime and anywhere connectivity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
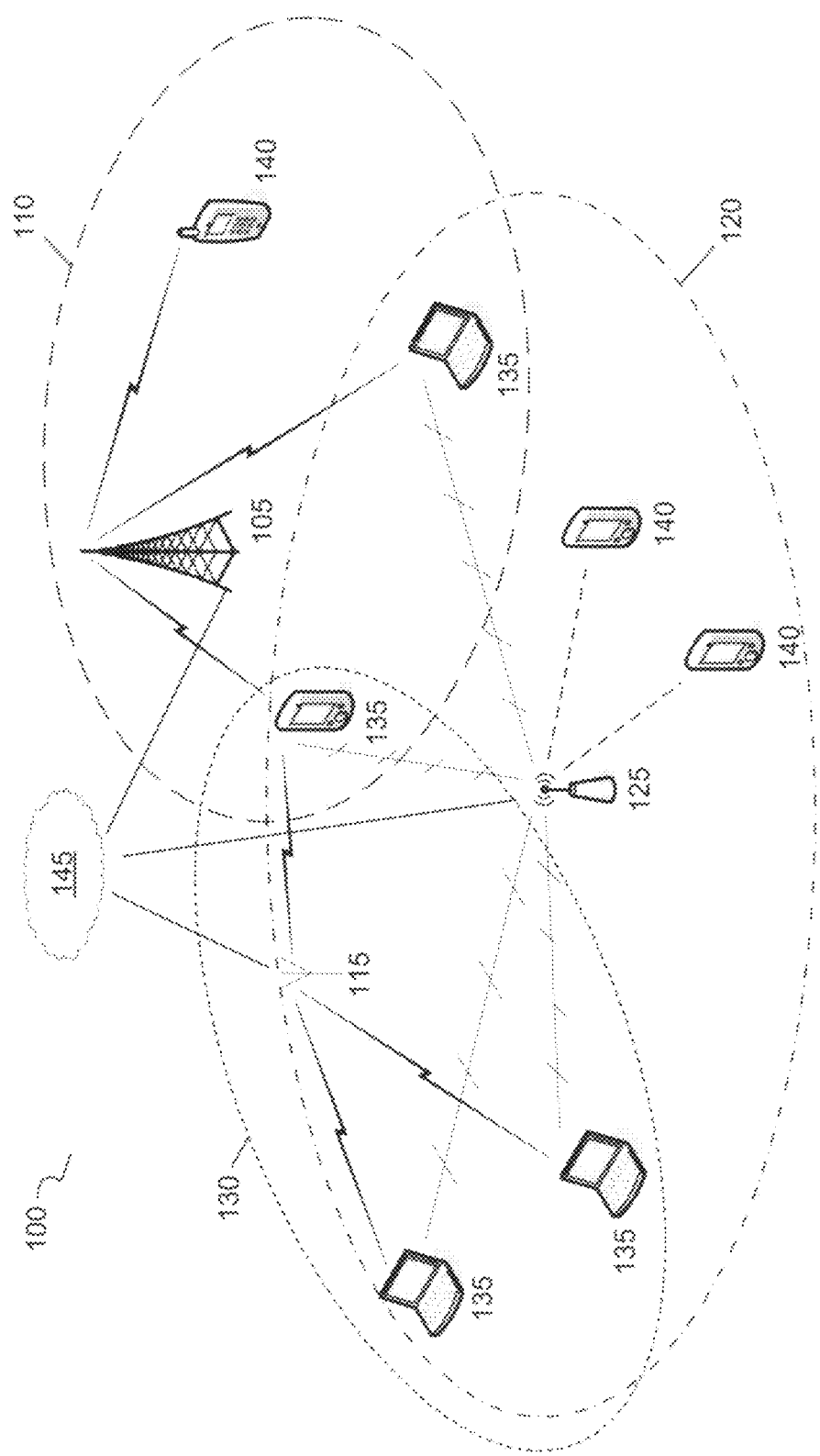
FIG. 1 illustrates wireless networks in accordance with some embodiments.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for providing multi-radio coordination in a heterogeneous wireless network are set forth to provide a thorough understanding of the invention. However, it will be understood by those skilled in the art that the present invention may be practiced without these specific details. In other instances, well-known methods, procedures, components and circuits have not been described in detail so as not to obscure the present invention.

It would be an advance in the art to provide a system and methods for multi-radio coordination of wireless networks wherein at least one of the wireless networks is used to provide resource management and/or scheduling information for another wireless network. For example, a first wireless network that implements resource management and scheduling protocols such as channel-aware scheduling, multi-cell coordination, fractional frequency reuse, and opportunistic beam forming can provide relatively high data throughput by implementing channel quality indicator feedback(s) and a centralized scheduling mechanism. In contrast, a second wireless network, such as a contention based wireless network does not explicitly limit channel access among available clients. A link condition after successful probing of the second wireless network can be good or poor due to possible interference, leading to relatively low data throughput as multiple clients attempt to access the second network.

Implementation of a technique such as coordinated carrier sense multiple access with collision avoidance (coordinated CSMA/CA) that utilizes heterogeneous networking and multi-radio coordination capabilities of client devices can provide base station (BS) assisted scheduling utilizing feedback links over the first wireless network using a first air interface using a first radio. A feedback mechanism to link clients and a BS that involves the client devices feeding back their channel quality indicators (CQI) for a number of different air interfaces that run over separate radios allows the second network with limited capabilities to benefit from an associated network, such as the first network, having centralized scheduling and CQI feedback capabilities.

Now turning to the figures, FIG. 1 illustrates a wireless communication system 100 in accordance with some embodiments of the invention. The wireless communication system 100 may include one or more wireless networks, generally shown as 110 and 120. In particular, the wireless communication system 100 may include a wireless metropolitan area network (WMAN) 110 and a wireless local area network (WLAN) 120. Although FIG. 1 depicts two wireless networks, the wireless communication system 100 may include additional or fewer wireless communication networks. For example, the wireless communication system 100 may include one or more wireless personal area networks (WPANs) not shown, additional WLANs, and/or WMANs. The methods and apparatus described herein are not limited in this regard.

The wireless communication system 100 also includes one or more stations including subscriber stations or mobile stations generally shown as multi-radio subscriber stations 135 capable of accessing a plurality of wireless networks, and single-radio subscriber stations 140 capable of accessing a single wireless network. For example, the subscriber stations 135 and 140 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts seven subscriber stations, the wireless communication system 100 may include more or less subscriber stations 135 and 140.

The subscriber stations 135 and 140 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless links.

In an example, the subscriber stations 135 and 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the subscriber stations may communicate with devices associated with the WLAN 120 or an access point 125 via wireless links. The AP 125 may be operatively coupled to a router (not shown). Alternatively, the AP 125 and the router may be integrated into a single device (e.g., a wireless router).

The subscriber stations (e.g. multi-radio subscriber station 135 and a single-radio subscriber station 140) may use OFDM or OFDMA modulation to transmit large amounts of digital data by splitting a radio frequency signal into multiple small sub-signals, which in turn, are transmitted simultaneously at different frequencies. In particular, the subscriber stations may use OFDM modulation to implement the WMAN 110. For example, the multi-radio subscriber station 135 may operate in accordance with the 802.16 family of standards developed by IEEE to provide for fixed, portable, and/or mobile broadband wireless access (BWA) networks (e.g., the IEEE std. 802.16, published 2004) to communicate with the base station 105, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). In some embodiments, access point 125 and base station 105 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although the scope of the invention is not limited in this respect as they may also be suitable to transmit and/or receive communications in accordance with other techniques and standards. In some embodiments, access point 125 and base station 105 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

The WMAN 110 and WLAN 120 may be operatively coupled to a common public or private network 145 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 145 via the AP 125 and/or femtocell 115. In another example, the WMAN 110 may be operatively coupled to the common public or private network 145 via the base station 105.

The wireless communication system 100 may include other suitable wireless communication networks. For example, the wireless communication system 100 may include a wireless wide area network (WWAN) (not shown). The subscriber stations may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Although FIG. 1 depicts a WLAN 120, and a WMAN 110, the wireless communication system 100 may include other combinations of WPANs, WLANs, WMANs, and/or WWANs. The methods and apparatus described herein are not limited in this regard.

The wireless communication system 100 may further include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
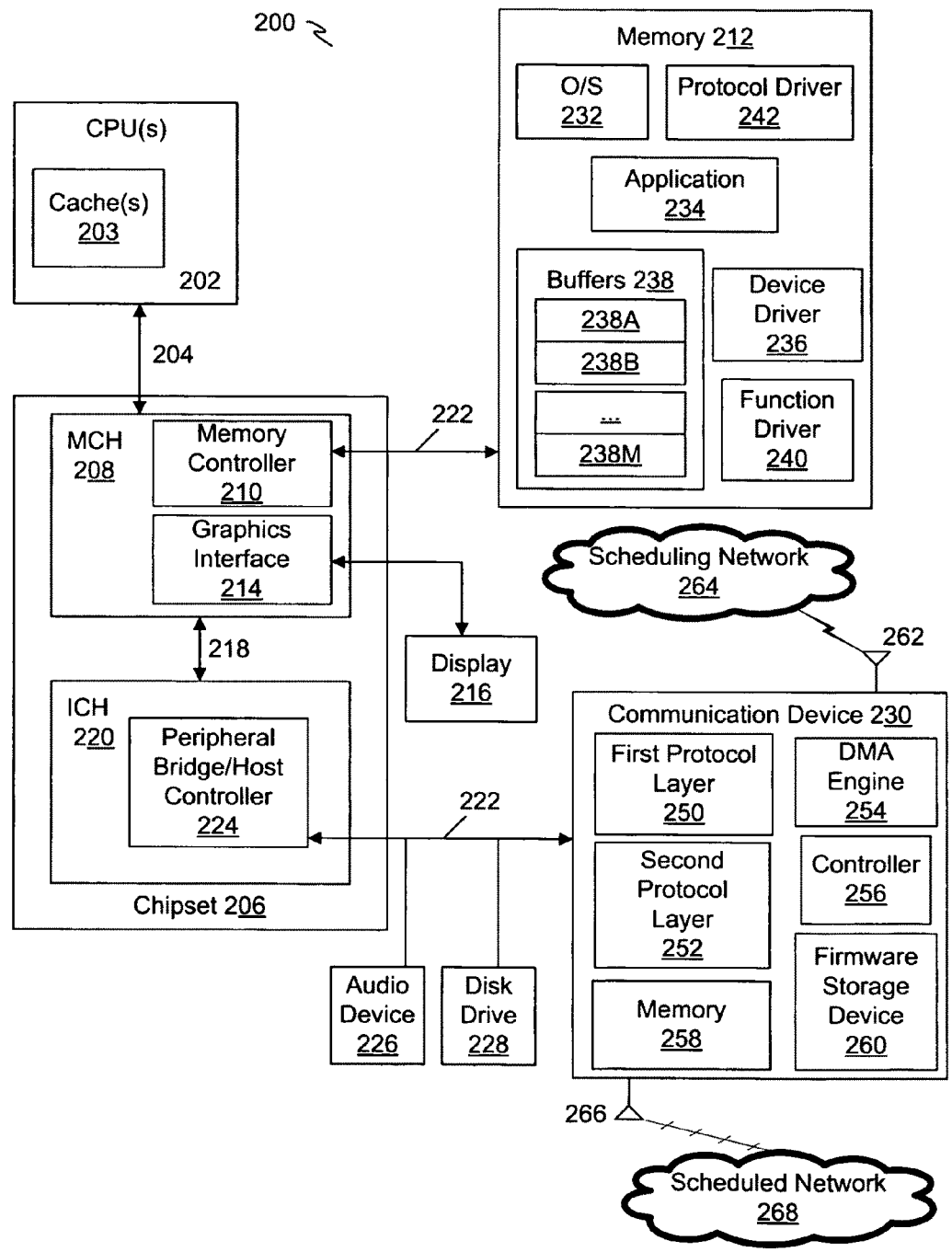
FIG. 2 illustrates a block diagram of a multi-com platform in accordance with various embodiments.

FIG. 2 illustrates a block diagram of a multiple communication (multi-com) platform 200 with two radios in accordance with various embodiments of the invention. The multi-com platform 200 may include one or more host processors or central processing unit(s) (CPUs) 202 (which may be collectively referred to herein as "processors 202" or more generally "processor 202") coupled to an interconnection network or bus 204. The processors 202 may be any type of processor such as a general purpose processor, a network processor (which may process data communicated over a computer network), etc. (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors.

The processor 202 may include one or more caches 203, which may be private and/or shared in various embodiments. Generally, a cache 203 stores data corresponding to original data stored elsewhere or computed earlier. To reduce memory access latency, once data is stored in a cache 203, future use may be made by accessing a cached copy rather than refetching or recomputing the original data. The cache 203 may be any type of cache, such a level 1 (L1) cache, a level 2 (L2) cache, a level 3 (L-3), a mid-level cache, a last level cache (LLC), etc. to store electronic data (e.g., including instructions) that is utilized by one or more components of the multi-com platform 200.

A chipset 206 may additionally be coupled to the interconnection network 204. The chipset 206 may include a memory control hub (MCH) 208. The MCH 208 may include a memory controller 210 that is coupled to a memory 212. The memory 212 may store data, e.g., including sequences of instructions that are executed by the processor 202, or any other device in communication with components of the multi-com platform 200. In various embodiments, the memory 212 may include one or more volatile storage or memory devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 204, such as multiple processors and/or multiple system memories.

The MCH 208 may further include a graphics interface 214 coupled to a display 216, e.g., via a graphics accelerator. In various embodiments, the display device 216, which, for example may include a flat panel display or a cathode ray tube, may be coupled to the graphics interface 214 through, for example, a signal converter that translates a digital representation of an image stored in a storage device such as video memory or system memory into display signals that are interpreted and displayed by the display. The display signals produced by the display device 216 may pass through various control devices before being interpreted by and subsequently displayed on the display device 216.

As shown in FIG. 2, a hub interface 218 may couple the MCH 208 to an input/output control hub (ICH) 220. The ICH 220 may provide an interface to input/output (I/O) devices coupled to the multi-com platform 200. The ICH 220 may be coupled to a bus 222 through a peripheral bridge or host controller 224, such as a peripheral component interconnect (PCI) bridge, a universal serial bus (USB) controller, etc. The controller 224 may provide a data path between the processor 202 and peripheral devices. Other types of topologies may be utilized. Also, multiple buses may be coupled to the ICH 220, for example, through multiple bridges or controllers. For example, the bus 222 may comply with the Universal Serial Bus Specification, Revision 1.1, Sep. 23, 1998, and/or Universal Serial Bus Specification, Revision 2.0, Apr. 27, 2000 (including subsequent amendments to either revision). Alternatively, the bus 222 may comprise other types and configurations of bus systems. Moreover, other peripherals coupled to the ICH 220 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 222 may be coupled to an audio device 226, one or more rotating or solid state disk drive(s) 228, and a communication device 230, which in various embodiments may be a network interface card (NIC) or a tuner card. Other devices may be coupled to the bus 222. Also, various components such as the communication device 230 may be coupled to the MCH 208 in various embodiments. In addition, the processor 202 and the MCH 208 may be combined to form a single chip.

Additionally, the multi-com platform 200 may include volatile and/or nonvolatile memory or storage. For example, nonvolatile memory may include one or more of the following: read-only memory (ROM), programmable ROM (PROM), erasable PROM (EPROM), electrically EPROM (EEPROM), a disk drive or solid state drive (e.g., 228), a floppy disk, a compact disk ROM (CD-ROM), a digital versatile disk (DVD), flash memory, a magneto-optical disk, or other types of nonvolatile machine-readable media capable of storing electronic data including instructions.

The memory 212 may include one or more of the following in various embodiments: an operating system (O/S) 232, application 234, device driver 236, buffers 238, function driver 240, and/or protocol driver 242. Programs and/or data stored in the memory 212 may be swapped into the solid state drive 228 as part of memory management operations. The processor(s) 302 executes various commands and processes one or more packets 246 with one or more computing devices coupled a scheduling network 264 and/or a scheduled network 268 (such as the multi-radio subscriber station 135 and/or single-radio mobile station 140 of FIG. 1). In various embodiments, a packet may be a sequence of one or more symbols and/or values that may be encoded by one or more electrical signals transmitted from at least one sender to at least one receiver (e.g., over a network such as the network 102). For example, each packet may have a header that includes information that may be utilized in routing and/or processing of the packet may comprise the continuity counter, a sync byte, source address, a destination address, packet type, etc. Each packet may also have a payload that includes the raw data or content the packet is transferring between various stations.

In various embodiments, the application 234 may utilize the O/S 232 to communicate with various components of the multi-com platform 200, e.g., through the device driver 236 and/or function driver 240. For example, the device driver 236 and function driver 240 may be used for different categories, e.g., device driver 236 may manage generic device class attributes, whereas the function driver 240 may manage device specific attributes (such as USB specific commands). In various embodiments, the device driver 236 may allocate one or more buffers to store packet data.

As illustrated in FIG. 2, the communication device 230 includes a first network protocol layer 250 and a second network protocol layer 252 for implementing the physical communication layer to send and receive network packets to and from the base station 105, the femtocell station 115, the access point 125, and/or other multi-com platform(s) 200 (e.g. multi-radio subscriber station 135, single-radio mobile station 140). The communication device 230 may further include a direct memory access (DMA) engine 252, which may write packet data to buffers 238 to transmit and/or receive data. Additionally, the communication device 230 may include a controller 254, which may include logic, such as a programmable processor for example, to perform communication device related operations. In various embodiments, the controller 254 may be a MAC (media access control) component. The communication device 230 may further include a memory 256, such as any type of volatile/nonvolatile memory (e.g., including one or more cache(s) and/or other memory types discussed with reference to memory 212).

In various embodiments, the communication device 230 may include a firmware storage device 260 to store firmware (or software) that may be utilized in management of various functions performed by components of the communication device 230. The storage device 260 may be any type of a storage device such as a non-volatile storage device. For example, the storage device 260 may include one or more of the following: ROM, PROM, EPROM, EEPROM, disk drive, floppy disk, CD-ROM, DVD, flash memory, a magneto-optical disk, or other types of nonvolatile machine-readable media capable of storing electronic data, including instructions.

In various embodiments, bus 222 may comprise a USB bus. Isochronous mode is one of the four data flow types for USB devices (the others being Control, Interrupt and Bulk). Isochronous mode is commonly used for streaming multimedia data types such as video or audio sources. In isochronous mode, a device can reserve bandwidth on the bus making isochronous mode desirable for multimedia applications.

Figure 3:
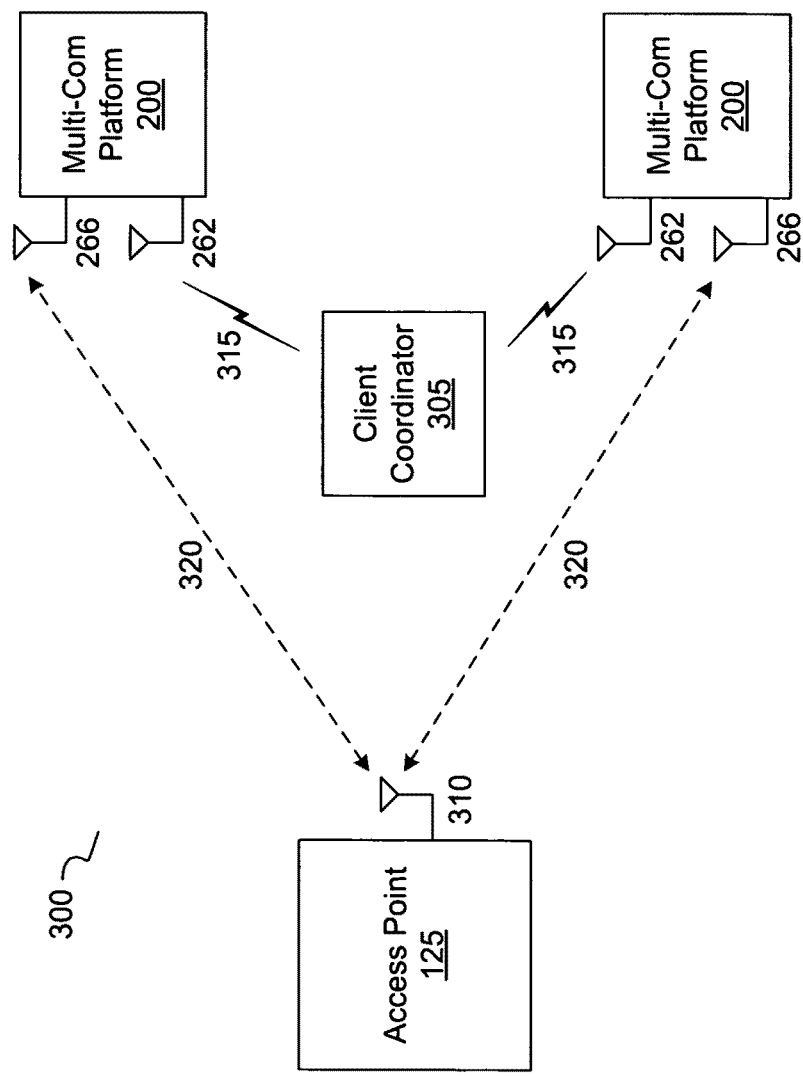
FIG. 3 is a block diagram of a heterogeneous wireless network in accordance with some embodiments.

FIG. 3 is a block diagram of a heterogeneous wireless network 300 in accordance with some embodiments. The heterogeneous wireless network 300 in this embodiment comprises a client coordinator 305 operated through a station such as the base station 105 of FIG. 1, an access point 125, and multi-com platforms 200. The multi-com platforms 200, such as the multi-radio subscriber stations 135 of FIG. 1 may be configured with two or more air interfaces and multiple radios. In this embodiment, each multi-com platform 200 comprises the scheduling radio 262 and the scheduled radio 266, wherein the scheduling radio 262 communicates with the client coordinator 305 over a scheduling signal 315 in a second channel and the scheduled radio 266 communicates with the access point 125 or femtocell 115 over a scheduled signal 320 in a first channel. In one embodiment, the first channel comprises a plurality of parallel orthogonal channels governed by a random multiple access protocol.

Scheduling radio 262 and scheduled radio 266 each comprises one or more antennas (not shown). Each antenna may comprise one or more directional or omnidirectional antennas, including, for example, dipole antennas, monopole antennas, patch antennas, loop antennas, microstrip antennas, or other types of antennas suitable for transmission of radio frequency (RF) signals. In some embodiments, instead of two or more antennas, a single antenna with multiple apertures may be used. In these embodiments, each aperture may be considered a separate antenna. In some multiple-input, multiple-output (MIMO) embodiments, the multi-com platform 200 may use two or more of antennas that may be effectively separated to take advantage of spatial diversity and the different channel characteristics that may result between each of the antennas and the client coordinator 305 and/or the access point 125.

The multi-com platform 200 provides wireless communications in accordance with two or more wireless communication techniques or standards. In the example embodiments illustrated in FIG. 3, the multi-com platform 200 communicates with the client coordinator 305 using a scheduling signal 315. The scheduling signal 315 may be a signal transferred in a WiMAX network, a 3GLTE or an ultrawideband network. The multi-com platform 200 may also communicate with the access point 125 using a scheduled signal 320. The scheduled signal 320 may be a signal transferred using a 802.11 network or another network that operates under a random access protocol such as carrier sense multiple access with collision avoidance (CSMA/CA).

The multi-com platform 200 may also include other circuitry (not illustrated) including processing circuitry to coordinate the operations within the multi-com platform. In some embodiments, the processing circuitry communicates information and provides multi-radio coordination between the scheduling radio 262 and the scheduled radio 266.

Figure 4:
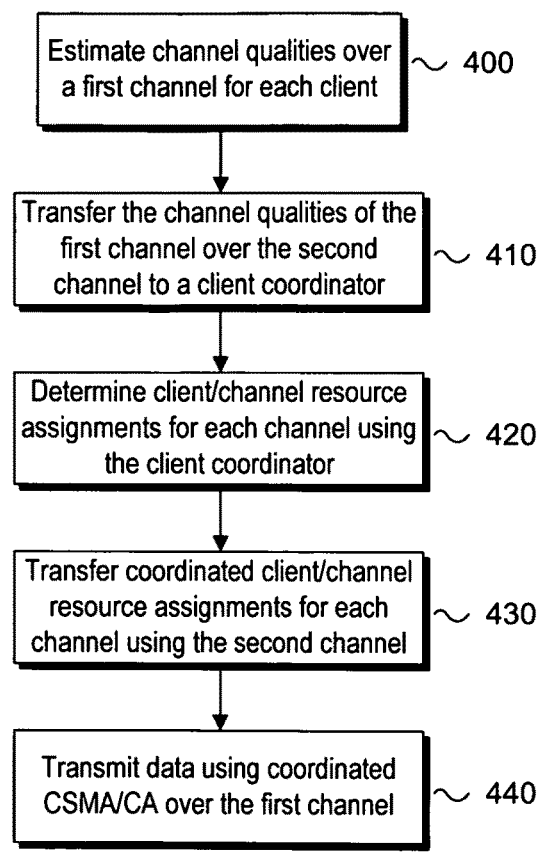
FIG. 4 is a flowchart that describes an embodiment of a method for multi-radio coordination of heterogeneous wireless networks.

FIG. 4 is a flowchart that describes an embodiment of a method for multi-radio coordinated CSMA/CA of a plurality of multi-com platforms 200 in heterogeneous wireless networks, such as the WMAN 110 and WLAN 110 networks of FIG. 1. The client or multi-com platform 200 of FIG. 2 estimates channel conditions for a channel of a first link (e.g. WPAN or the WLAN 120 network of FIG. 1) accessed using the first protocol layer 250. In this embodiment, one or more multi-com platforms 200 estimate channel conditions in element 400 using pilot symbols sent over the channel by measuring and/or estimating a signal to interference and noise ratio (SINR) of the first link, such as a scheduled signal 320 between the access point 125 and the multi-com platform 200 of FIG. 3. Estimates of the channel state are communicated or transferred in the multi-com platform 200 or client from a first protocol layer 250 to a second protocol layer 252 using a multi-radio functionality according to one embodiment of the invention.

The channel state estimates for the first link accessed using the first protocol layer 250 through the scheduled radio 266 are communicated or transmitted in element 410 using the second protocol layer 252 through the scheduling radio 262 to a client coordinator or master terminal such as the base station 105 using a second link such as the scheduling signal 315. In another embodiment, the channel state estimates for the first link are sent to another multi-com platform 200 in a mesh network and communicated using the second protocol layer 252 through the scheduling radio 262 of another multi-com platform 200 to the client coordinator.

In element 420 of this embodiment, the client coordinator or base station 105 determines resource assignments by comparing channel qualities, quality of service (QoS) targets of the clients, and any other relevant control information for the multi-com platforms 200 in communication with the base station 105. In this embodiment, priority levels are established for the plurality of multi-com platforms 200 using a random access priority level, such as through a back-off period size, for each client or multi-com platform 200 over the first link or channel to realize the best client and associated channel resource, such as a combination of time and/or frequency assignments in each channel to optimize QoS values including but not limited to throughput, fairness, and delay.

Communications by the multi-com platforms 200 over the first link may further be scheduled when determining resource assignments using one or more scheduling algorithms including maximum-SINR, round robin, and proportional-fair scheduling algorithms. The proportional-fair scheduling algorithm uses relative channel quality, not absolute channel quality so that temporal fairness is guaranteed even though average channel qualities are different. The scheduling decisions may be updated periodically accounting for temporal changes in channel qualities, queue sizes, number of receiving clients, and application QoS demands. In some embodiments, resource management and scheduling techniques to find the best link assignments may also consider multi-hop routing among transmitting clients exploiting the heterogeneous multi-radio peer to peer connectivity among them, which may be used for data forwarding such as through client relaying mechanisms.

The resource assignments are transmitted to the plurality of multi-com platforms 200 in element 430 using the second link or scheduling signal 315. In one embodiment, the assignments received by each multi-com platform 200 are communicated or transferred in the multi-com platform 200 from the second protocol layer 252, or a second radio to the first protocol layer 250, or a first radio using the multi-radio functionality described above.

Data is transmitted using coordinated CSMA/CA over the first channel in element 440. In this embodiment, transmissions from the clients or multi-com platforms 200 of FIG. 2 are scheduled according to the scheduling algorithm of the client coordinator. Each of the multi-com platforms 200 attempts to send their data using their assigned resources over the scheduled signal 320 or first link in a coordinated CSMA/CA environment, subject to contention and interference from other stations, including other multi-com platforms 200. However, different from traditional CSMA/CA, the channel access of the clients is prioritized according to an established schedule as determined by the client coordinator, or base station 105 in this embodiment, using channel quality data fed to the client coordinator as described in element 410.

Though channel access is scheduled according to embodiments of the invention, stations or clients such as the single-radio subscriber station 140 of FIG. 1 may also operate in the wireless communication system without coordinated CSMA/CA. In case of collisions, each coordinated CSMA/CA client such as the multi-com platform 200 may wait for a randomly chosen back-off period. In one embodiment, the randomly chosen back-off period is determined according to an exponential rule. A value of the back-off delay may be determined by the client coordinator or base station 105 for each client based at least in part on one or more of channel qualities over the first link, QoS criteria, and control information. Prioritization of the clients or multi-com platforms 200 may be dynamically updated by the client coordinator, periodically accounting for temporal changes in channel qualities, queue sizes, number of receiving clients, fairness constraints, and application QoS demands, and transmitted by the client coordinator or base station 105 to the clients or stations.

In an embodiment where the wireless communication system 100 comprises a Wi-Fi interface for the first link of scheduled network 268 and a WiMAX interface for the second link of scheduling network 264, the client coordinator or base station 105 would collect Wi-Fi channel quality information (CQI) from all transmitting clients during uplink WiMAX transmissions, such as through CQI reports describing channel quality over the first link. Scheduling information to be used for the Wi-Fi links such as back-off periods of each client, priority index among the clients, and resource and channel assignments are advertised to the clients during its downlink transmission in a downlink MAP (DL-MAP).

In the presence of coordinated CSMA/CA, there are two types of CQI feedback from the clients to the client coordinator over the second links, or WiMAX links in this embodiment. The first type of CQI feedback is CQI between the client coordinator or base station 105 and client devices over the WiMAX links. This CQI feedback occurs for each client on a per OFDMA sub-channel basis. The second type of CQI feedback is CQI for client devices over the first links, or Wi-Fi links in this embodiment. This CQI information is sent to the client coordinator or base station 105 by clients over the WiMAX links. In this embodiment, Wi-Fi CQI represents the channel quality experienced by each client over an entire OFDM band and can be computed using frequency-averaging techniques such as physical layer (PHY) abstractions. Use of PHY abstractions allow for representation of the entire OFDM band by a single CQI metric. As a result, additional overhead carried by the second link to describe CQI of the first link will be a minor addition to packets transmitted over the second link.

Figure 5:
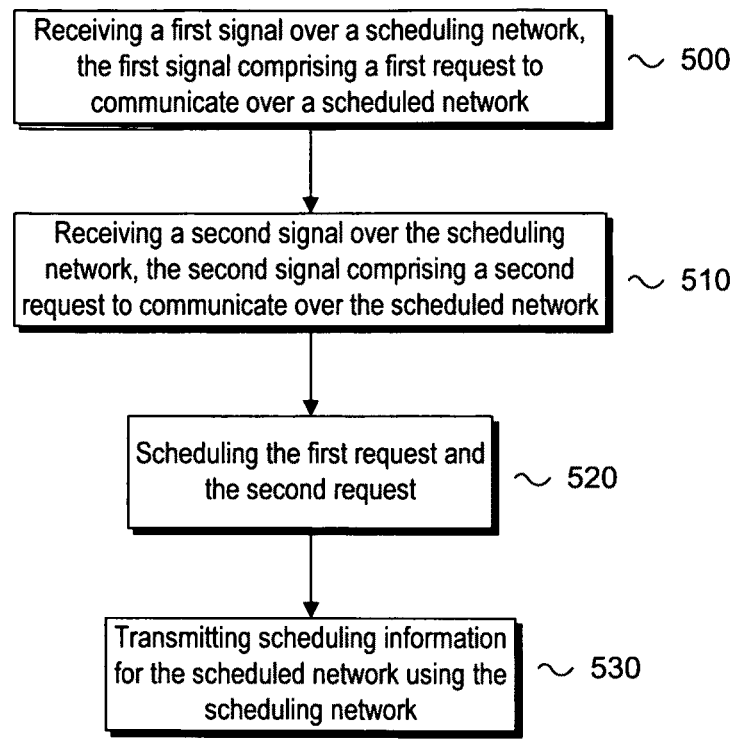
FIG. 5 is a flowchart that describes an alternate embodiment of a method for multi-radio coordination of heterogeneous wireless networks.

FIG. 5 is a flowchart that describes an alternate embodiment of a method for multi-radio coordinated CSMA/CA of heterogeneous wireless networks. In element 500, a first signal is received over a scheduling network 264 from a first multi-com platform 200 configured to communicate over a scheduled network 268 and the scheduling network 264. Further, the first signal comprises a first request to communicate over the scheduled network 268. In this embodiment, the scheduled network 268 is a WLAN 120 and the scheduling network 264 is a WMAN 110, though the embodiment is not so limited.

In element 510, a second signal is received over the scheduling network 264 from a second multi-com platform 200 configured to communicate over the scheduled network 268 and the scheduling network 264. Further, the second signal comprises a second request to communicate over the scheduled network 268. The first request and the second request are scheduled using the client coordinator 305 in element 520 based at least in part by comparing channel qualities, quality of service (QoS) targets of the clients, or multi-com platforms 200, and any other relevant control information for the multi-com platforms 200 in communication with the client coordinator, which may be the base station 105 of FIG. 1. The scheduling information is transmitted for the scheduled network 268 using the scheduling network 264 in element 530.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by the wireless access network 100, performs a desired transmission of multicast broadcast service. The programs in the wireless access network 100 may be considered components of a software environment.

The operation discussed herein may be generally facilitated via execution of appropriate firmware or software embodied as code instructions on the host processor and microcontroller of the multi-com platform 200, the base station 105, the femtocell station 115, the access point 125 and/or the multi-radio subscriber station 135, as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for wireless communications, comprising:
   estimating channel qualities of a first channel operative to communicate using a first wireless standard;
   transmitting the channel qualities of the first channel to a client coordinator using a second channel operative to communicate using a second wireless standard different than the first wireless standard;
   receiving a resource assignment from a client coordinator over the second channel based on the channel qualities of the first channel and channel qualities of the second channel; and
   transmitting data over the first channel, according to the received resource assignment, using coordinated carrier sense multiple access with collision avoidance;
   wherein the first channel is a Wi-Fi channel and the second channel is a WiMAX channel.

2. The method of claim 1, further including transmitting pilot symbols for estimating the channel qualities of the first channel.

3. The method of claim 1, wherein the first channel consists of a plurality of parallel orthogonal channels governed by a random multiple access protocol.

4. The method of claim 1, wherein the client coordinator determines a random access priority level when determining resource assignments.

5. The method of claim 4, wherein the resource assignments are scheduled using one or more scheduling algorithms.

6. The method of claim 5, wherein the scheduling algorithm is selected from group consisting of maximum signal to interference and noise ratio (SINR), round robin, and proportional-fair scheduling algorithms.

7. A method for coordinating heterogeneous network communications, comprising:
   receiving a first signal over a scheduling network from a first multi-com platform configured to communicate over a scheduled network using a first wireless protocol and over the scheduling network using a second wireless protocol, the first signal comprising a first request to communicate over the scheduled network and the first and second wireless protocols comprising different wireless protocols;
   receiving a second signal over the scheduling network from a second multi-com platform configured to communicate over the scheduled network and the scheduling network, the second signal comprising a second request to communicate over the scheduled network;
   determining resource assignments for the first request and the second request using a client coordinator; and
   transmitting resource assignments for the scheduled network to the first multi-com platform and the second multi-com platform using the scheduling network and based on channel qualities of the scheduled network and the scheduling network;
   wherein the scheduled network is a Wi-Fi network and the scheduling network is a WiMAX network.

8. The method of claim 7, wherein the resource assignments are based at least in part on comparison of channel qualities and quality of service (QoS) targets of the first multi-com platform and the second multi-com platform.

9. The method of claim 7, wherein the scheduled network comprises a plurality of parallel orthogonal channels governed by a random multiple access protocol.

10. The method of claim 7, wherein the client coordinator determines a random access priority level when determining resource assignments for each multi-com platform.

11. The method of claim 8, wherein the resource assignments are scheduled using one or more scheduling algorithms.

12. The method of claim 11, wherein the scheduling algorithm is selected from group consisting of maximum signal to interference and noise ratio (SINR), round robin, and proportional-fair scheduling algorithms.

13. A multi-com platform comprising:
   a first protocol layer for communicating over a scheduled network using a first wireless protocol, wherein the scheduled network lacks channel state reporting and scheduling protocols;
   a second protocol layer for communicating over a scheduling network using a second wireless protocol, the scheduling network having a centralized scheduling mechanism, wherein second protocol layer is configured to receive resource assignments for the scheduled network based on channel qualities of the scheduled network and the scheduling network and wherein the first and second wireless protocols comprise different wireless protocols; and
   a bus coupled to the first protocol layer and the second protocol layer for transferring the scheduling information from the second protocol layer to the first protocol layer;
   wherein the scheduled network is a Wi-Fi network and the scheduling network is a WiMAX network.

14. The multi-com platform of claim 13, wherein the resource assignments are based at least in part on comparison of channel qualities and quality of service (QoS) targets of the multi-com platform and another multi-com platform.

15. The multi-corn platform of claim 13, wherein the scheduled network comprises a plurality of parallel orthogonal channels governed by a random multiple access protocol.

16. The multi-corn platform of claim 13, wherein the resource assignments are scheduled using one or more scheduling algorithms.

17. The multi-corn platform of claim 16, wherein the scheduling algorithms are selected from group consisting of maximum signal to interference and noise ratio (SINR), round robin, and proportional-fair scheduling algorithms.

* * * * *

UNITED STATES PATENT AND TRADEMARK OFFICE
CERTIFICATE OF CORRECTION

PATENT NO. : 8,462,695 B2
APPLICATION NO. : 12/454505
DATED : June 11, 2013
INVENTOR(S) : Ozgur Oyman et al.

Page 1 of 1

It is certified that error appears in the above-identified patent and that said Letters Patent is hereby corrected as shown below:

In the Claims:

In column 12, line 48, In Claim 15, delete "multi-corn" and insert -- multi-com --, therefor.

In column 12, line 51, In Claim 16, delete "multi-corn" and insert -- multi-com --, therefor.

In column 12, line 54, In Claim 17, delete "multi-corn" and insert -- multi-com --, therefor.

Signed and Sealed this
Thirteenth Day of August, 2013

Teresa Stanek Rea
*Acting Director of the United States Patent and Trademark Office*